United States Patent [19]

Miyahara et al.

[11] Patent Number: 4,952,813
[45] Date of Patent: Aug. 28, 1990

[54] RADIOGRAPHIC INTENSIFYING SCREEN AND PROCESS FOR THE PREPARATION OF THE SAME

[75] Inventors: Junji Miyahara; Akira Kitada, both of Kaisei, Japan

[73] Assignee: Fuji Photo Film Co., Ltd., Kanagawa, Japan

[21] Appl. No.: 233,608

[22] Filed: Jun. 13, 1988

Related U.S. Application Data

[63] Continuation of Ser. No. 527,492, Aug. 29, 1983, abandoned.

[30] Foreign Application Priority Data

Aug. 30, 1982 [JP] Japan ............................ 57-149069
Aug. 30, 1982 [JP] Japan ............................ 57-149070

[51] Int. Cl.$^5$ ............................................ G21K 4/00
[52] U.S. Cl. .............................. 250/483.1; 427/157; 428/690
[58] Field of Search ............... 250/483.1, 486.1; 427/65, 157; 428/690, 691

[56] References Cited

U.S. PATENT DOCUMENTS 4,224,524  9/1980  Suys et al. ................ 250/486.1
4,298,650 11/1981  Lu ............................... 427/157
4,472,635  9/1984  Yokota et al. ............. 250/483.1
4,501,971  2/1985  Ochiani ..................... 250/483.1

FOREIGN PATENT DOCUMENTS 76542  6/1980  Japan ............................ 427/369

Primary Examiner—Carolyn E. Fields
Attorney, Agent, or Firm—Sixbey, Friedman, Leedom & Ferguson

[57] ABSTRACT

A radiographic intensifying screen comprising a support and a phosphor-containing resin layer provided thereon, in which the void ratio of said phosphor-containing resin layer is reduced in comparison with an ordinarily prepared phosphor-containing resin layer having the same binder-phosphor ratio and formed by a coating procedure conducted under an atmospheric pressure.

The void ratio is not more than 85% of the void ratio of the ordinarily prepared phosphor-containing resin layer for a phosphor-containing resin layer which contains a resinous binder and a phosphor in a weight ratio of 1:1 to 1:25, the ratio of 1:25 being exclusive, and the void ratio is not more than 90% for a phosphor-containing resin layer which contains a resinuous binder and a phosphor in a weight ratio of 1:25 to 1:100.

28 Claims, 1 Drawing Sheet

RADIOGRAPHIC INTENSIFYING SCREEN AND PROCESS FOR THE PREPARATION OF THE SAME

This is continuation of Ser. No. 5247,492, filed Aug. 29, 1983, now abandoned.

BACKGROUND OF THE INVENTION

1. Field of the Invention

This invention relates to a radiographic intensifying screen and a process for the preparation of the same. More particularly, this invention relates to a radiographic intensifying screen comprising a support a phosphor-containing resin layer provided thereon in which a resinous binder and a phosphor are contained in a weight ratio of 1 : 1 to 1 : 100, and a process for the preparation of the same.

2. Description of Prior Arts

In a variety of radiographic processes such as medical radiography for diagnosis and industrial radiography for nondestructive inspection, a radiographic intensifying screen is employed in close contact with one or both surfaces of a radiographic film such as an X-ray film for enhancing the radiographic speed of the system. The radiographic intensifying screen consists essentially of a support and a phosphor-containing resin layer provided thereon. Further, a transparent film is generally provided on the free surface of the phosphor-containing resin layer to keep the layer from chemical and physical deterioration.

The phosphor-containing resin layer comprises a resinous binder and phosphor particles dispersed therein. The phosphor-containing resin layer is generally provided on a support under an atmospheric pressure utilizing the following coating procedure.

The phosphor particles and the resinous binder are mixed in an appropriate solvent to prepare a coating dispersion. The coating dispersion is directly applied onto a surface of a support for a radiographic intensifying screen under an atmospheric pressure using a doctor blade, roll coater, knife coater or the like, and the solvent contained in the coating dispersion applied is removed to form a phosphor-containing resin layer. Alternatively, the phosphor-containing resin layer is provided on the support by applying the coating dispersion onto a false support such as a glass plate under an atmospheric pressure, removing the solvent from the coating dispersion to form a phosphor-containing resin film, peeling off the film from the false support, and then causing the film to adhere to the genuine support.

When excited with a radiation such as X-rays passing through an object, the phosphor particles contained in the phosphor-containing resin layer emit light of high luminance in proportion to the dose of the radiation. Accordingly, an X-ray film placed in close contact with the phosphor-containing resin layer can be exposed sufficiently to form a radiation image of the object, even if the radiation is applied to the object at a relatively small dose.

It is desired for the radiographic intensifying screen having the above-mentioned basic structure to exhibit a high radiographic speed and to provide an image of high quality (high sharpness and high graininess). In particular, from the viewpoint of obtaining more accurate and detailed information of an object, it is desired to develop a radiographic intensifying screen which provides an image of improved sharpness.

SUMMARY OF THE INVENTION

Accordingly, an object of the present invention is to provide a radiographic intensifying screen particularly improved in the sharpness of the image provided therby, and a process for the preparation of the same.

There is provided by the present invention a radiographic intensifying screen comprising a support and a phosphor-containing resin layer provided thereon which contains a resinous binder and a phosphor in a weight ratio of 1 1 to 1 : 25, the ratio of 1 : 25 being exclusive, characterized in that the void ratio of said phosphor-containing resin layer is not more than 85 % of the void ratio of the phosphor-containing resin layer having the corresponding binder-phosphor ratio and formed by a coating procedure conducted under an atmospheric pressure.

There is also provided by the present invention a radiographic intensifying screen comprising a support and a phosphor-containing resin layer provided thereon which contains a resinous binder and a phosphor in a weight ratio of 1 : 25 to 1 : 100, characterized in that the void ratio of said phosphor-containing resin layer is not more than 90 % of the void ratio of the phosphor-containing resin layer having the corresponding binder-phosphor ratio and formed by a coating procedure conducted under an atmospheric pressure.

The above-mentioned radiographic intensifying screen can be prepared by:

(1) a process which comprises subjecting a sheet comprising a support and a phosphor-containing resin layer provided thereon which contains a resinous binder and a phosphor in a weight ratio of 1 : 1 to 1 : 25, the ratio of 1 : 25 being exclusive, or in a weight ratio of 1 : 25 to 1 : 100, and which has been formed by a coating procedure conducted under an atmospheric pressure on said support to compression treatment so as to reduce the void ratio of the phosphor-containing resin layer to a value of not more than 85 % or a value of not more than 90 %, respectively, of the void ratio of the untreated phosphor-containing resin layer, or (2) a process which comprises:

subjecting a phosphor-containing resin layer which contains a resinous binder and a phosphor in a weight ratio of 1 : 1 to 1 : 25, the ratio of 1 : 25 being exclusive, or in a weight ratio of 1 : 25 to 1 : 100 and which has been formed by a coating procedure conducted under an atmospheric pressure to compression treatment so as to reduce the void ratio of the phosphor-containing resin layer to a value of not more than 85 % or not more than 90 %, respectively, of the void ratio of the untreated phosphor-containing resin layer, and providing thus treated phosphor-containing resin layer onto the support.

According to the present invention, a radiographic intensifying screen which provides an image of prominently improved sharpness can be obtained by reducing the void of the phosphor-containing resin layer to the above-defined extent in comparison with the void of the phosphor-containing resin layer containing the same resinous binder and phosphor in the same ratio which is formed by a coating procedure conducted under an atmospheric pressure.

More in detail, when a phosphor-containing resin layer comprising a phosphor and a resinous binder (referred to hereinafter as a phosphor layer) is formed on a support by an ordinary coating procedure conducted under an atmospheric pressure, air is apt to be introduced into the phosphor layer, whereby voids are produced therein. The voids are apt to be formed particularly in the vicinity of the phosphor particles. In particular, as the ratio of the amount of the phosphor to that of the binder is increased, the phosphor particles ought to be packed more densely, which results in formation of more voids in the phosphor layer.

When a radiation such as X-rays passing through an object impinges upon the phosphor layer of the radiographic intensifying screen, the phosphor particles contained in the phosphor layer absorb the radiation energy and immediately emit light having a wavelength within near ultraviolet to visible region. The so emitted light impinges upon a photosensitive layer of a film to contribute the formation of the radiographic image of the object. The amount of the light emitted by the phosphor layer increases as the phosphor content in the phosphor layer is increased, and the increase thereof brings about enhancement of the radiographic speed. On the other hand, the sharpness of the image is principally determined depending upon the thickness of the phosphor layer. More in detail, as the thickness of the phosphor layer increases, the light emitted by the phosphor particles is likely more diffused in the phosphor layer. Therefore, an obscure image is recorded on the radiographic film, which lowers the sharpness of the image. Accordingly, the sharpness of the radiographic image can be improved by reducing the thickness of a phosphor layer.

According to the study of the present inventors, it was discovered that the sharpness of the radiographic image can be prominently improved by reducing the void ratio of phosphor layer of the radiographic intensifying screen to a level of not more than 85 % (for a phosphor layer containing a binder and a phosphor in a ratio of 1 : 1 to 1 : 25, in which the ratio of 1 : 2% is not inclusive) or of not more than 90 % (for a phosphor layer containing a binder and a phosphor in a ratio of 1 : 25 : 25 to 1 : 100) of the void ratio of the phosphor layer formed by a conventional coating procedure conducted under an atmospheric pressure and containing the same binder and phosphor in the same ratio. The phosphor layer having the reduced void ratio is more dense with the phosphor particles and therefore, is thinner in the thickness than the phosphor layer pressed under an atmospheric pressure, so that the radiographic intensifying screen having the void ratio-reduced phosphor layer provides an image distinctly improved in sharpness.

The radiographic intensifying screen of the present invention has, as described above, a phosphor layer containing phosphor particles with higher density as compared with that of the conventional radiographic intensifying screen. Accordingly, for instance, if the phosphor layer of the radiographic intensifying screen of the present invention is prepared to have the same thickness as that of the phosphor layer of the conventional one, the phosphor layer of the screen of the present invention necessarily contains phosphor particles in larger amount than the conventional one does. Thus, the radiographic intensifying screen of the present invention can bring about enhancement of the radiographic speed without reducing the sharpness of the image provided thereby. In other words, the radiographic intensifying screen of the present invention brings about higher radiographic speed, as compared with the conventional radiographic intensifying screens providing an image of the same sharpness. Contrary to this, the radiographic intensifying screen of the present invention provides an image of higher sharpness than the conventional radiographic intensifying screens exhibiting the same radiographic speed.

Furthermore, the radiographic intensifying screen of the present invention in which a protective layer is colored provides an image of improved graininess in comparison with the conventional radiographic intensifying screens exhibiting the same radiographic speed and sharpness.

BRIEF DESCRIPTION OF THE DRAWINGS

In FIG. 1, A indicates a relationship between a spatial frequency and an MTF value in the case of using the radiographic intensifying screen of Example 1 (according to the present invention); and B indicates a relationship between a spatial frequency and an MTF value in the case of using the radiographic intensifying screen of Comparison Example 1 (conventional screen prepared by an ordinary coating procedure).

In FIG. 2, A indicates a relationship between a spatial frequency and an MTF value in the case of using the radiographic intensifying screen of Example 13 (according to the present invention); and B indicates a relationship between a spatial frequency and an MTF value in the case of using the radiographic intensifying screen of Comparison Example 3 (conventional screen prepared by an ordinary coating procedure).

DETAILED DESCRIPTION OF THE INVENTION

Figure 1:
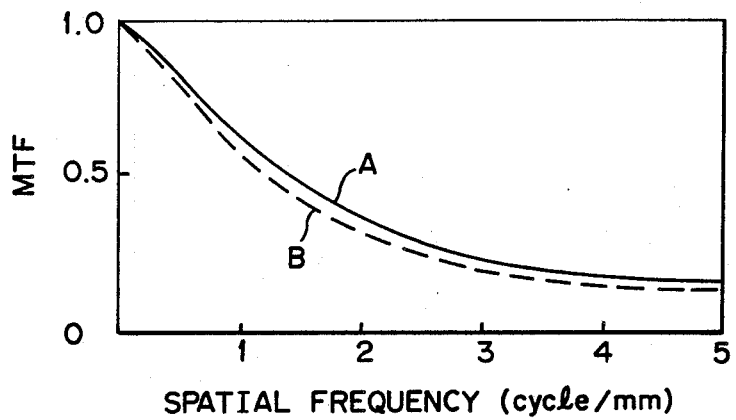
FIG. 1 graphically illustrates MTF (Modulation Transfer Function) measured on an MTF chart image formed on an X-ray film using the radiographic intensifying screens of Example 1 and Comparison Example 1.

The radiographic intensifying screen of the present invention having the above-described advantageous characteristics can be prepared, for instance, in the following manner.

The phosphor layer of the radiographic intensifying screen comprises a resinous binder and phosphor particles dispersed therein.

A variety of phosphors employable for a radiographic intensifying screen have been known, and any one of them can be used in the present invention. Examples of the phosphor preferably employable in the present invention include:

tungstate phosphors such as $CaWO_4$, $MgWO_4$, and $CaWO_4:Pb$;

terbium activated rare earth oxysulfide phosphors such as $Y_2O_2S:Tb$, $Gd_2O_2S:Tb$, $La_2O_2S:Tb$, $(Y,Gd)_2O_2S:Tb$, and $(Y,Gd)_2O_2S:Tb,Tm$;

terbium activated rare earth phosphate phosphors such as $YPO_4:Tb$, $GdPO_4:Tb$ and $LaPO_4:Tb$;

terbium activated rare earth oxyhalide phosphors such as $LaOBr:Tb$ $LaOBr:Tb,Tm$, $LaOCl:Tb$, $LaOCl:Tb,Tm$, $GdOBr:Tb$, and $GdOCl:Tb$:

thulium activated rare earth oxyhalide phosphors such as $LaOBr:Tm$ and $LaOCl:Tm$;

barium sulfate phosphors such as $BaSO_4:Pb$, $BaSO_4:Eu^{2+}$, and $(Ba,Sr)SO_4:Eu^{2+}$;

divalent europium activated alkaline earth metal fluorohalide phosphors such as $BaFCl:Eu^{2+}$, $BaFBr:Eu^{2+}$, $BaFCl:Eu^{2+},Tb$, $BaFBr:Eu^{2+},Tb$, $BaF_2$-

$BaCl_2 \cdot KCl:Eu^{2+}$, $BaF_2 \cdot BaCl_2 \cdot xBaSO_4 \cdot KCl:Eu^{2+}$, and $(Ba,Mg)F_2 \cdot BaCl_2 \cdot KCl:Eu^{2+}$;

iodide phosphors such as CsI:Na, CsI:Tl, NaI:Tl, and KI:Tl;

sulfide phosphors such as ZnS:Ag, (Zn,Cd)S:Ag, (Zn,Cd)S:Cu, and (Zn,Cd)S:Cu,Al; and hafnium phosphate phosphors such as $HfP_2O_7Cu$.

The above-described phosphors are given by no means to restrict the phosphor employable in the present invention. Any other phosphors can also be employed, provided that the phosphor emits light having a wavelength within near ultraviolet to visible region when exposed to a radiation such as X-rays.

Examples of the resinous binder to be contained in the phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinylidene chloride-vinyl chloride copolymer, polymethyl methacrylate, vinyl chloride-vinyl acetate copoymer, polyurethane, cellulose acetate butyrate, polyvinyl alcohol, and linear polyester. Particularly preferred are nitrocellulose, linear polyester, and a mixture of nitrocellulose and linear polyester.

The phosphor layer can be formed on the support, for instance, by the following procedure.

In the first place, phosphor particles and a resinous binder are added to an appropriate solvent, and then they are mixed to prepare a coating dispersion of the phosphor particles in the binder solution.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane ethylene glycol monoethylether and ethylene glycol monoethyl ether; and mixtures of the above-mentioned compounds.

The ratio between the resinous binder and the phosphor in the coating dispersion may be determined according to the characteristics of the aimed radiographic intensifying screen and the nature of the phosphor employed. Generally, the ratio therebetween is within the range of from 1 : 1 to 1 : 100 (binder : phosphor, by weight), preferably from 1 : 8 to 1 : 85.

The coating dispersion may contain a dispersing agent to assist the dispersibility of the phosphor particles therein, and also contain a variety of additives such as a plasticizer for increasing the bonding between the binder and the phosphor particles in the phosphor layer. Examples of the dispersing agent include phthalic acid, stearic acid, caproic acid and a hydrophobic surface-active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly to the surface of a support to form a layer of the coating dispersion. The coating procedure can be carried out by a conventional method such as a method using a doctor blade, a roll coater or a knife coater.

After applying the coating dispersion to the support, the coating dispersion is then heated slowly to dryness so as to complete the formation of a phosphor layer. The thickness of the phosphor layer varies depending upon the characteristics of the aimed radiographic intensifying screen, the nature of the phosphor, the ratio between the binder and the phosphor, etc. Generally, the thickness of the phosphor layer is within a range of from 20 $\mu m$ to 1 mm, preferably from 50 to 500 $\mu m$.

The phosphor layer can be provided onto the support by the methods other than that given in the the above. For instance, the phosphor layer is initially prepared on a sheet (false support) such as a glass plate, metal plate or plastic sheet using the aforementioned coating dispersion and then thus prepared phosphor layer is overlaid on the genuine support by pressing or using an adhesive agent.

The phosphor layer may be colored by a coloring agent for enhancement of the graininess of the radiographic intensifying screen.

The support material employed in the present invention can be selected from those employed in the conventional radiogaphic intensifying screens. Examples of the support material include plastic films such as films of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. Among these materials, a plastic film is preferably employed as the support material. The plastic film may contain a light-absorbing material such as carbon black, or may contain a light-reflecting material such as titanium dioxide. The former is appropriate for preparing a high sharpness type radiographic intensifying screen, while the latter is appropriate for preparing a high speed type radiographic intensifying screen.

In the conventional radiographic intensifying screen, one or more additional layers are occasionally provided between the support and the phosphor layer, so as to enhance the adhesion between the support and the phosphor layer, or to improve the radiographic speed of the intensifying screen or the quality of an image provided thereby. For instance, a subbing layer or an adhesive layer may be provided by coating polymer material such as gelatin over the surface of the support on the phosphor layer side. Otherwise, a light-reflecting layer or a light-absorbing layer may be provided by forming a polymer material layer containing a light-reflecting material such as titanium dioxide or a light-absorbing material such as carbon black. In radiographic intensifying screens employed in the industrial radiography for nondestructive testing, a metal foil is optionaly provided on the phosphor layer side surface of the support, so as to remove scattered radiation. Such a metal foil is chosen from lead foil, lead alloy foil, tin foil and the like. In the present invention, one or more of these additional layers may be provided depending on the type of the intensifying screen to be obtained.

The phosphor layer side surface of the support (or the surface of an adhesive layer, light-reflecting layer, light-absorbing layer or a metal foil in the case where such layers provided on the phosphor layer) may be provided with protruded and depressed portions for enhancement of the sharpness of radiographic image, and the constitution of those protruded and depressed portions can be selected depending on the purpose of the radiographic intensifying screen.

The void ratio of the phosphor-containing resin layer formed on the support in the manner as described above can be calculated theoretically by the following formula (I), $$\frac{V_{air}}{V} = \frac{(a + b)\rho x \rho y V - A(a\rho y + b\rho x)}{V((a + b)\rho x \rho y - a\rho y \rho_{air} - b\rho x \rho_{air})} \quad (I)$$

in which V is a total volume of the phosphor layer; $V_{air}$ is a volume of air contained in the phosphor layer; A is a total weight of the phosphor layer; $\rho x$ is a density of the phosphor; $\rho y$ is a density of the binder; $\rho_{air}$ is a density of air; a is a weight of the phosphor; and b is a weight of the binder.

In the formula (I), $\rho_{air}$ is nearly 0. Accordingly, the formula (I) can be approximately rewritten in the form of the following formula (II):

$$\frac{V_{air}}{V} = \frac{(a + b)\rho x \rho y V - A(a\rho y + b\rho x)}{V((a + b)\rho x \rho y)} \quad (II)$$

in which V, $V_{air}$, A, $\rho x$, $\rho y$, a and b have the same meanings as defined in the formula (I).

In the present invention, the void ratio of the phosphor layer is expressed by a value calculated according to the formula (II).

As an example, a procedure for formation of a phosphor layer comprising a terbium activated gadolinium oxysulfide phosphor and a mixture of a linear polyester and nitrocellulose (serving as resinous binder) on a support is described below.

In the first place, a mixture of a linear polyester and nitrocellulose and terbium activated gadolinium oxysulfide phosphor particles ($Gd_2O_2S:Tb$) are mixed well in methyl ethyl ketone using a propeller agitater in such conditions that a ratio between the mixture and the phosphor is adjusted to 1 : 20 by weight, to prepare a coating dispersion having a viscosity of 30 PS (at 25° C.). The coating dispersion is applied evenly to a polyethylene terephthalate sheet (support) under an atmospheric pressure using a doctor brade. The support having the dispersion applied is then placed in an oven and heated at a temperature gradually increasing from 25 to 100° C., to form a phosphor layer on the support.

In one example, thus formed phosphor layer containing the binder and the phosphor in the ratio of 1 : 20 had a void ratio of 25.8 %.

The same procedure as described above was repeated except that the ratio between the binder and the phosphor is replaced with a ratio of 1 : 10. The produced phosphor layer had a void ratio of 10.7 %.

The same procedure as described above was repeated except that the ratio between the binder and the phosphor is replaced with a ratio of 1 : 40. The produced phosphor layer had a void ratio of 32.2 %.

The same procedures as described above was repeated except that the ratio between the binder and the phosphor is replaced with a ratio of 1 : 80. The produced phosphor layer had a void ratio of 35.0 %.

According to the study of the present inventors, it has been confirmed that the above-described phosphor layers are representative of those produced by the conventional coating procedure conducted under an atmospheric pressure. This means that the void ratio does not vary in a wide range even if other different binders, phosphor particles, or solvents are employed for the production of phosphor layers, provided that the ratio of the binder and the phosphor is kept at the same level. Further, in calculation of the void ratio according to the formula (II), additives incorporated into the coating dispersion can be neglected because these are added only in a small amount. Furthermore, the void ratio of a phosphor layer is not noticeably influenced by variation of coating conditions, so far as the coating procedure is carried out in a conventional manner under an atmospheric pressure.

Accordingly, as is evident from the above-mentioned formula (II), the void ratio of the phosphor layer varies principally by the ratio between the binder and the phosphor, that is, b : a, by weight, as defined in the formula (II). As the ratio of the phosphor particles to the binder in the phosphor layer is increased, an average distance between the phosphor particles dispersed in the binder becomes shorter, and voids are apt to be produced therebetween at a relatively high level. For this reason, the void ratio of the phosphor layer tends to increase when the content of the phosphor in the phosphor layer is increased.

In the process for the preparation of the radiographic intensifying screen of this invention, a part of air contained in the phosphor layer is subsequently removed to decrease the void. For instance, the void can be decreased by subjecting the phosphor layer to a compression treatment.

The compression treatment given to the phosphor layer is generally carried out at a temperature ranging from a room temperature to a temperature in the vicinity of the melting point of the binder contained in the phosphor layer and under a pressure ranging from 50 to 1500 kg./cm². Preferably, the compresssion treatment is carried out under heating. A compressing period is preferably within a range of from 30 sec. to 5 min. A preferred pressure is within the range of from 300 to 700 kg./cm². A temperature is determined depending upon the binder employed, and the temperature preferably is from 50° to 120°.

Examples of the compressing apparatus for the compression treatment employable in the invention include known apparatus such as a calender roll and a hot press. For instance, a compression treatment using a calender roll involves moving a sheet consisting essentially of a support and a phosphor layer to pass through between two rollers heated at a certain temperature at a certain speed. A compression treatment using a hot press involves fixing the above-mentioned sheet between two metal plates heated at a certain temperature, and compressing the sheet from both sides up to a certain pressure for a certain period. The compressing apparatus employable in the invention is not restricted to the calender roll and hot press. Any other apparatus can be employed as far as it can compress a sheet such as the above-mentioned one under heating.

In the case where a phosphor-containing resin film is initially formed on a false support, the compression treatment can be applied to the film prior to providing the film onto a genuine support for a radiographic intensifying screen. In this case, the phosphor-containing resin film is subjected to the compression treatment singly or in the form of a sheet combined with the false support, and then the treated film is provided onto the genuine support.

The conventional radiographic intensifying screen generally has a transparent film on a free surface of a phosphor layer to protect the phosphor layer from physical and chemical deterioration. In the intensifying screen of the present invention, it is preferable to provide a transparent film for the same purpose.

The transparent film can be provided onto the phosphor layer by coating the surface of the phosphor layer with a solution of a transparent polymer such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the transparent film can be provided onto the phosphor layer by beforehand preparing it from a polymer such as polyethylene terephthalate, polyethylene, polyvinylidene chloride or polyamide, followed by placing and fixing it onto the phosphor layer with an appropriate adhesive agent. The transparent protective film preferably has a thickness within a range of approximately 3 to 20 $\mu$m.

The transparent protective film can be colored for enhancing the graininess of the resulting radiographic intensifying screen.

In the case where the weight ratio between the binder and the phosphor is within a range of 1 : 1 to 1 : 25 (1 : 25 is not inclusive), the phosphor layer of the radiographic intensifying screen according to the present invention produced by the above-described representative method should have a void ratio of not more than 85 % of that of the phosphor layer having the same ratio and produced by a conventional coating procedure conducted under an atmospheric pressure. Generally, the void ratio (absolute value) of the thus produced phosphor layer does not exceed 28 %.

On the other hand, in the case where the weight ratio between the binder and the phosphor is within a range of 1 : 25 to 1 : 100, the phosphor layer of the radiographic intensifying screen according to the present invention produced by the above-described representative method should have a void ratio of not more than 90 % of that of the phosphor layer having the same ratio and produced by a conventional coating procedure conducted under an atmospheric pressure. Generally, the void ratio (absolute value) of the thus produced phosphor layer does not exceed 35 %.

As described above, the density of the phosphor contained in the phosphor layer of the radiographic intensifying screen becomes higher as the void ratio of the phosphor layer decreases. Accordingly, the phosphor layer can be made thinner, and the sharpness of the image provided by the screen can be prominently enhanced, as compared with the conventional phosphor layer at the same phosphor content level.

The following examples further illustrate the present invention, but these examples are by no means understood to restrict the invention.

EXAMPLE 1

A resinous binder mixture of a linear polyester resin and nitrocellulose (nitrification degree: 11.5 %) and a particulated terbium activated gadolinium oxysulfide phosphor ($Gd_2O_2S:Tb$) were mixed in a ratio of 1 : 20 (binder : phosphor, by weight). To the mixture was added methyl ethyl ketone and the resulting mixture was stirred sufficiently by means of a propeller agitater to prepare a coating dispersion containing homogeneously dispersed phosphor particles and having a viscosity of 30 PS (at 25° C.).

The coating dispersion was uniformly applied to a polyethylene terephthalate sheet containing titanium dioxide (support, thickness; 250 $\mu$m) placed horizontally on a glass plate. The coating procedure was carried out using a doctor blade. The support having the coating dispersion applied was then placed in an oven and heated at a temperature gradually rising from 25° to 100° C. Thus, a sheet consisting of a support and a phosphor layer (thickness: approx., 120 $\mu$m) was prepared.

Subsequently, the thus prepared sheet consisting of a support and a phosphor layer provided thereon was compressed under a pressure of 020 kg./cm$^2$ and at a temperature of 100° C. using a calendar roll.

On the phosphor layer of the support having been subjected to the compression treatment was placed a transparent polyethylene terephthalate film (thickness: 12 $\mu$m; provided with a polyester adhesive layer) to combine the transparent film and the phosphor layer through the adhesive layer.

Thus, a radiographic intensifying screen consisting of a support, a phosphor layer and a transparent protective film was prepared.

EXAMPLE 2

The procedure of Example 1 was repeated except that the sheet consisting of a support and a phosphor layer was subjected to a compression treatment under a pressure of 520 kg./cm$^2$ and at a temperature of 100° C., to prepare a radiographic intensifying screen consisting of a support, a phosphor layer and a transparent protective film.

EXAMPLE 3

The procedure of Example 1 was repeated except that the sheet consisting of a support and a phosphor layer was subjected to a compression treatment under a pressure of 420 kg./cm$^2$ and at a temperature of 100° C., to prepare a radiographic intensifying screen consisting of a support, a phosphor layer and a transparent protective film.

EXAMPLE 4

The procedure of Example 1 was repeated except that the sheet consisting of a support and a phosphor layer was subjected to a compression treatment under a pressure of 620 kg./cm$^2$ and at a temperature of 80° C., to prepare a radiographic intensifying screen consisting of a support, a phosphor layer and a transparent protective film.

EXAMPLE 5

The procedure of Example 1 was repeated except that the sheet consisting of a support and a phosphor layer was subjected to a compression treatment under a pressure of 520 kg./cm$^2$ and at a temperature of 80° C., to prepare a radiographic intensifying screen consisting of a support, a phosphor layer and a transparent protective film.

EXAMPLE 6

The procedure of Example 1 was repeated except that the sheet consisting of a support and a phosphor layer was subjected to a compression treatment under a pressure of 420 kg./cm$^2$ and at a temperature of 80° C., to prepare a radiographic intensifying screen consisting of a support, a phosphor layer and a transparent protective film.

COMPARISON EXAMPLE 1

The procedure of Example 1 was repeated except that the sheet consisting of a support and a phosphor layer was not subjected to compression treatment, to prepare a radiographic intensifying screen consisting of a support, a phosphor layer and a transparent protective film.

The void ratio of the phosphor layer of the radiographic intensifying screen prepared in the manner as described above was calculated from the aforementioned formula (II) using a measured volume and weight of the phosphor layer, a density of the phosphor (7.5 g./cm$^3$) and a density of the binder (1.258 g./cm$^3$).

The results are set forth in Table 1.

TABLE 1

|  | Pressure (kg/cm$^2$) | Temperature (°C.) | Void Ratio (%) | Relative Void Ratio (%) |
|---|---|---|---|---|
| Example 1 | 620 | 100 | 16.4 | 63.6 |
| 2 | 520 | 100 | 17.0 | 65.9 |
| 3 | 420 | 100 | 17.4 | 67.4 |
| 4 | 620 | 80 | 19.7 | 76.4 |
| 5 | 520 | 80 | 20.7 | 80.2 |
| 6 | 420 | 80 | 21.6 | 83.7 |
| Com. Example 1 | — | — | 25.8 | 100 |

The radiographic intensifying screens prepared in the above-described Example 1 and Comparison Example 1 were evaluated on the image sharpness according to the following sharpness of image test.

A radiographic intensifying screen was combined with an X-ray film in a cassette, and exposed to X-rays through an MTF chart. The film was then developed to obtain a visible image, and the MTF value was determined.

The results are graphically illustrated in FIG. 1, in which:

Curve (A) indicates a relationship between a spatial frequency and an MTF value given in the case of using the radiographic intensifying screen of Example 1; and Curve (B) indicates a relationship between a spatial frequency and an MTF value given in the case of using the radiographic intensifying screen of Comparison Example 1.

The sharpness of image given in the case of using each radiographic intensifying screen is set forth in Table 2 in terms of an MTF value determined at a spatial frequency of 2 cycle/mm.

TABLE 2

|  | Sharpness |
|---|---|
| Example 1 | 0.34 |
| Com. Example 1 | 0.30 |

EXAMPLE 7

The procedure of Example 1 was repeated except that the binder mixture of a linear polyester resin and nitrocellulouse (nitrification degree: 11.5%) and the particulated terbium activated gadolinium oxysulfide phosphor (Gd$_2$O$_2$:Tb) were mixed in a ratio of 1 : 10 (binder : phosphor, by weight), to prepare a radiographic intensifying screen consisting of a support, a phosphor layer and a transparent protective film.

EXAMPLE 8

The procedure of Example 7 was repeated except that the sheet consisting of a support and a phosphor layer was subjected to a compression treatment under a pressure sure of 520 kg./cm$^2$ and at a temperature of 100° C., to prepare a radiographic intensifying screen consisting of a support, a phosphor layer and a transparent protective film.

EXAMPLE 9

The procedure of Example ? was repeated except that the sheet consisting of a support and a phosphor layer was subjected to a compression treatment under a pressure of 420 kg./cm$^2$ and at a temperature of 100° C., to prepare a radiographic intensifying screen consisting of a support, a phosphor layer and a transparent protective film.

EXAMPLE 10

The procedure of Example 7 was repeated except that the sheet consisting of a support and a phosphor layer was subjected to a compression treatment under a pressure of 620 kg./cm$^2$ and at a temperature of 80° C., to prepare a radiographic intensifying screen consisting of a support, a phosphor layer and a transparent protective film.

EXAMPLE 11

The procedure of Example 7 was repeated except that the sheet consisting of a support and a phosphor layer was subjected to a compression treatment under a pressure of 520 kg./cm$^2$ and at a temperature of 80° C., to prepare a radiographic intensifying screen consisting of a support, a phosphor layer and a transparent protective film.

EXAMPLE 12

The procedure of Example 7 was repeated except that the sheet consisting of a support and a phosphor layer was subjected to a compression treatment under a pressure of 420 kg./cm$^2$ and at a temperature of 80° C., to prepare a radiographic intensifying screen consisting of a support, a phosphor layer and a transparent protective film.

COMPARISON EXAMPLE 2

The procedure of Example 7 was repeated except that the sheet consisting of a support and a phosphor layer was not subjected to compression treatment, to prepare a radiographic intensifying screen consisting of a support, a phosphor layer and a trasparent protective layer.

The void ratio of the phosphor layer of the radiographic intensifying screen prepared in the manner as described above was calculated in the same manner as described hereinbefore.

The results are set forth in Table 3.

TABLE 3

|  | Pressure (kg/cm$^2$) | Temperature (°C.) | Void Ratio (%) | Relative Void Ratio (%) |
|---|---|---|---|---|
| Example 7 | 620 | 100 | 2.20 | 20.6 |
| 8 | 520 | 100 | 2.74 | 25.6 |
| 9 | 420 | 100 | 2.54 | 23.7 |
| 10 | 620 | 80 | 7.90 | 73.8 |
| 11 | 520 | 80 | 8.10 | 75.7 |
| 12 | 420 | 80 | 8.10 | 75.7 |

TABLE 3-continued

| | Pressure (kg/cm²) | Temperature (°C.) | Void Ratio (%) | Relative Void Ratio (%) |
|---|---|---|---|---|
| Com. Example 2 | — | — | 10.7 | 100 |

The radiographic intensifying screens prepared in the above-described Example 7 and Comparison Example 2 were evaluated on the image sharpness according to the aforementioned sharpness of image test.

The sharpness of image given in the case of using radiographic intensifying screen is set forth in Table 4 in terms of an MTF value determined at a spatial frequency of 2 cycle/mm.

TABLE 4

| | Sharpness |
|---|---|
| Example 7 | 0.30 |
| Com. Example 2 | 0.25 |

EXAMPLE 13

A resinous binder mixture of a linear polyester resin and nitrocellulose (nitrification degree: 11.5 %) and a particulated terbium activated gadolinium oxysulfide phosphor ($Gd_2O_2S$:Tb) were mixed in a ratio of 1 : 40 (binder : phosphor, by weight). To the mixture was added methyl ethyl ketone and the resulting mixture was stirred sufficiently by means of a propeller agitater to prepare a coating dispersion containing homogeneously dispersed phosphor particles and having a viscosity of 30 PS (at 25° C.).

The coating dispersion was uniformly applied to a polyethylene terephthalate sheet containing titanium dioxide (support, thickness; 250 μm) placed horizontally on a glass plate. The coating procedure was carried out using a doctor blade. The support having the coating dispersion applied was then placed in an oven and heated at a temperature gradually rising from 25° to 100° C. Thus, a sheet consisting of a support and a phosphor layer (thickness: approx. 120 μm) was prepared.

Subsequently, the thus prepared sheet consisting of a support and a phosphor layer provided thereon was compressed under a pressure of 620 kg./cm² and at a temperature of 100° C. using a calendar roll.

On the phosphor layer of the support having been subjected to the compression treatment was placed a transparent polyethylene terephthalate film (thickness: 12 μm; provided with a polyester andhesive layer) to combine the transparent film and the phosphor layer through the adhesive layer.

Thus, a radiographic intensifying screen consisting of a support, a phosphor layer and a transparent protective film was prepared.

EXAMPLE 14

The procedure of Example 13 was repeated except that the sheet consisting of a support and a phosphor layer was subjected to a compression treatment under a pressure of 520 kg./cm² and at a temperature of 100° C., to prepare a radiographic intensifying screen consisting of a support, a phosphor layer and a transparent protective film.

EXAMPLE 15

The procedure of Example 13 was repeated except that the sheet consisting of a support and a phosphor layer was subjected to a compression treatment under a pressure of 420 kg./cm² and at a temperature of 100° C., to prepare a radiographic intensifying screen consisting of a support, a phosphor layer and a transparent protective film.

EXAMPLE 16

The procedure of Example 13 was repeated except that the sheet consisting of a support and a phosphor layer was subjected to a compression treatment under a pressure of 620 kg./cm² and at a temperature of 80° C., to prepare a radiographic intensifying screen consisting of a support, a phosphor layer and a trensparent protective film.

EXAMPLE 17

The procedure of Example 13 was repeated except that the sheet consisting of a support and a phosphor layer was subjected to a compression treatment under a pressure of 520 kg./cm² and at a temperature of 80° C., to prepare a radiographic intensifying screen consisting of a support, a phosphor layer and a transparent protective film.

EXAMPLE 18

The procedure of Example 13 was repeated except that the sheet consisting of a support and a phosphor layer was subjected to a compression treatment under a pressure of 420 kg./cm² and at a temperature of 80° C., to prepare a radiographic intensifying screen consisting of a support, a phosphor layer and a transparent protective film.

COMPARISON EXAMPLE 3

The procedure of Example 13 was repeated except that the sheet consisting of a support and a phosphor layer was not subjected to compression treatment, to prepare a radiographic intensifying screen consisting of a support, a phosphor layer and a transparent protective film.

The void ratio of the phosphor layer of the radiographic intensifying screen prepared in the manner as described above was calculated from the aforementioned formula (II) using a measured volume and weight of the phosphor layer, a density of the phosphor (7.5 g./cm³) and a density of the binder (1.258 g./cm³).

The results are set forth in Table 5.

TABLE 5

| | Pressure (kg/cm²) | Temperature (°C.) | Void Ratio (%) | Relative Void Ratio (%) |
|---|---|---|---|---|
| Example 13 | 620 | 100 | 25.6 | 79.5 |
| 14 | 520 | 100 | 25.7 | 79.8 |
| 15 | 420 | 100 | 26.2 | 81.4 |
| 16 | 620 | 80 | 26.8 | 83.2 |
| 17 | 520 | 80 | 27.0 | 83.9 |
| 18 | 420 | 80 | 28.2 | 87.6 |
| Com. Example 3 | — | — | 32.2 | 100 |

The radiographic intensifying screens prepared in the above-described Example 13 and Comparison Example 3 were evaluated on the sharpness of image according to the aforementioned sharpness of image test.

Figure 2:
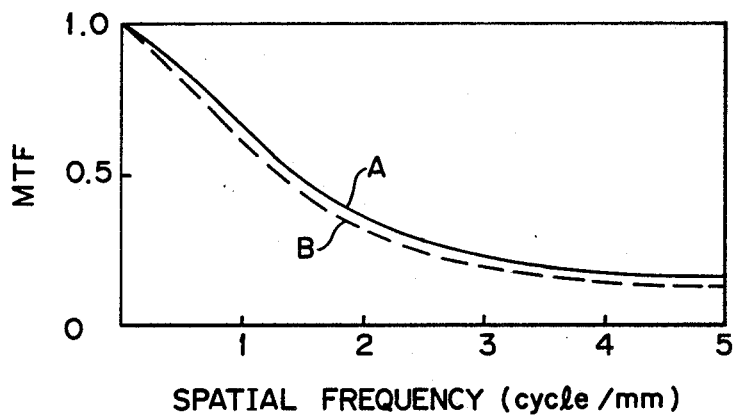
FIG. 2 also graphically illustrats MTF (Modulation Transfer Function) measured on an MTF chart image formed on an X-ray film using the radiographic intensifying screens of Example 13 and Comparison Example 3.

The results are graphically illustrated in FIG. 2, in which:

Curve (A) indicates a relationship between a spatial frequency and an MTF value given in the case of using the radiographic intensifying screen of Example 13; and Curve (B) indicates a relationship between a spatial frequency and an MTF value given in the case of using the radiographic intensifying screen of comparison Example 3.

The sharpness of image given in the case of using each radiographic intensifying screen is set forth in Table 6 in terms of an MTF value determined at a spatial frequency of 2 cycle/mm.

TABLE 6

|  | Sharpness |
|---|---|
| Example 13 | 0.36 |
| Com. Example 3 | 0.32 |

EXAMPLE 19

The procedure of Example 13 was repeated except that the binder mixture of a linear polyester resin and nitrocellulouse (nitrofication degree: 11.5%) and the particulated terbium activated gadolinium oxysulfide phosphor ($Gd_2O_2$:Tb) were mixed in a ratio of 1 : 80 (binder : phosphor, by weight), to prepare a radiographic intensifying screen consisting of a support, a phosphor layer and a transparent protective film.

EXAMPLE 20

The procedure of Example 19 was repeated except that the sheet consisting of a support and a phosphor layer was subjected to a compression treatment under a pressure of 520 kg./cm$^2$ and at a temperature of 100° C., to prepare a radiographic intensifying screen consisting of a support, a phosphor layer and a transparent protective film.

EXAMPLE 21

The procedure of Example 19 was repeated except that the sheet consisting of a support and a phosphor layer was subjected to a compression treatment under a pressure of 420 kg./cm$^2$ and at a temperature of 100° C., to prepare a radiographic intensifying screen consisting of a support, a phosphor layer and a transparent protective film.

EXAMPLE 22

The procedure of Example 19 was repeated except that the sheet consisting of a support and a phosphor layer was subjected to a compression treatment under a pressure of 620 kg./cm$^2$ and at a temperature of 80° C., to prepare a radiographic intensifying screen consisting of a support, a phosphor layer and a transparent protective film.

EXAMPLE 23

The procedure of Example 19 was repeated except that the sheet consisting of a support and a phosphor layer was subjected to a compression treatment under a pressure of 520 kg./cm$^2$ and at a temperature of 80° C., to prepare a radiographic intensifying screen consisting of a support, a phosphor layer and a transparent protective film.

The procedure of Example 19 was repeated except that the sheet consisting of a support and a phosphor layer was subjected to a compression treatment under a pressure of 420 kg./cm$^2$ and at a temperature of 80° C., to prepare a radiographic intensifying screen consisting of a support, a phosphor layer and a transparent protective film.

COMPARISON EXAMPLE 4

The procedure of Example 19 was repeated except that the sheet consisting of a support and a phosphor layer was not subjected to compression treatment, to prepare a radiographic intensifying screen consisting of a support, a phosphor layer and a trasparent protective layer.

The void ratio of the phosphor layer of the radiographic intensifying screen prepared in the manner as described above was calculated in the same manner as described hereinbefore.

The results are set forth in Table 7.

TABLE 7

|  | Pressure (kg/cm$^2$) | Temperature (°C.) | Void Ratio (%) | Relative Void Ratio (%) |
|---|---|---|---|---|
| Example 1 | 620 | 100 | 29.0 | 82.9 |
| 20 | 520 | 100 | 29.3 | 83.7 |
| 21 | 420 | 100 | 29.8 | 85.1 |
| 22 | 620 | 80 | 30.4 | 86.9 |
| 23 | 820 | 80 | 30.7 | 87.7 |
| 24 | 420 | 80 | 31.2 | 89.1 |
| Com. Example 4 | — | — | 35.0 | 100 |

The radiographic intensifying screens prepared in the above-described Example 19 and Comparison Example 4 were evaluated on the sharpness of image according to the aforementioned sharpness of image test.

The sharpness of image given in the case of using each radiographic intensifying screen is set forth in Table 8 in terms of an MTF value determined at a spatial frequency of 2 cycle/mm.

TABLE 8

|  | Sharpness |
|---|---|
| Example 19 | 0.40 |
| Com. Example 4 | 0.35 |

We claim:

1. A radiographic intensifying screen comprising a support and a phosphor-containing resin layer coated on said support at atmospheric pressure and then subjected to a compression treatment, wherein said resin layer contains a binder comprising a mixture of a linear polyester and nitrocellulose and a phosphor in a binder-to-phosphor weight ratio within the range of 1:1 to 1:25, and said resin layer further contains voids such that the void ratio of the compression treated phosphor-containing resin layer is not more than 85% of the void ratio of said layer prior to said compression treatment.

2. The radiographic intensifying screen as claimed in claim 1, in which said phosphor is a terbium activated gadolinium oxysulfide phosphor.

3. A process for the preparation of a radiographic intensifying screen comprising the steps of coating a phosphor-containing resin layer containing a resinous binder comprising a mixture of a linear polyester and nitrocellulose and a phosphor in a weight ratio within the range of 1:1 to 1:25 on a support under atmospheric pressure to form a coated sheet and subjecting the coated sheet to compression treatment so as to reduce the void ratio of the coated sheet to a value of not more than 85% of the void ratio of the untreated coated sheet.

4. The process as claimed in claim 3, in which said compression treatment is carried out under a pressure of 50–1500 kg./cm$^2$, and at a temperature of not less than room temperature, but not more than the melting point of the binder.

5. The process as claimed in claim 4 in which said compression treatment is carried out under a pressure of 300–700 kg./cm$^2$, and at a temperature of 50°–120° C.

6. The process as claimed in any one of claims 3 or 5, in which said compression treatment is carried out by means of a calender roll.

7. The process as claimed in any one of claims 4 or 5, in which said compression treatment is carried out by means of a hot press.

8. The process as claimed in any one of claim 6 or 7, in which said phosphor is a terbium activated gadolinium oxysulfide phosphor.

9. A process for the preparation of a radiographic intensifying screen comprising the steps of forming a hposphor-containing resin layer containing resinous binder comprising a mixture of a linear polyester and nitrocellulose, the weight ratio of said binder to phosphor being within the range of 1:1 to 1:25, by a coating procedure conducted under atmospheric pressure; subjecting the phosphor-containing resin layer to a compression treatment so a to reduce the void ratio of said phosphor-containing resin layer to a value of not more than 85% of the void ratio of the ntreated layer; and applying the compressed phosphor-containing resin layer to a support.

10. The process as claimed in claim 9, in which said compression treatment is carried out under a pressure of 50–1500 kg./cm$^2$, and at a temperature of not less than room temperature, but not more than the melting point of the binder.

11. The process as claimed in claim 10, in which said compression treatment is carried out under a pressure of 300–700 kg./cm$^2$, and at a temperature of 50°–120° C.

12. The process as claimed in any one of claim 10 or 14, in which said compression treatment is carried out by means of a calender roll.

13. The process as claimed in any one of claims 10 or 11 in which said compression treatment is carried out by means of a hot press.

14. The process as claimed in any one of claims 10 or 11 or 12 or 13, in which said phosphor is a terbium activated gadolinium oxysulfide phosphor.

15. A radiographic intensifying screen comprising a support and a phosphor-containing resin layer coated on said support at atmosphere pressure and then subjected to a compression treatment, wherein said resin layer contains a binder comprising a mixture of a linear polyester and nitrocellulose and a phosphor in a binder-to-phosphor weight ratio within the range of 1:25 to 1:100, and said resin layer further contains voids such that the void ratio of the compression treated phosphor-containing resin layer is not more than 90% of the void ratio of said layer prior to said compression treatment.

16. The radiographic intensifying screen as claimed in claim 15, in which said phosphor is a terbium activated gadolinium oxysulfide phosphor.

17. A process for the preparation of a radiographic intensifying screen which comprises subjecting a sheet comprising a support and a phosphor-containing resin layer provided thereon which contains a resinous binder and a phosphor in a weight ratio of 1 : 25 to 1 : 100, and which has been formed by a coating procedure conducted under an atmospheric pressure on said support to compression treatment so as to reduce the void ratio of the phosphor-containing resin layer to a value of not more than 90% of the void ratio of the untreated phosphor-containing resin layer, in which said resinous binder is a mixture of a linear polyester and nitrocellulose.

18. The process as claimed in claim 17, in which said compression treatment is carried out under a pressure of 50–1500 kg./cm$^2$, and at a temperature of not less than room temperature, but not more than the melting point of the binder.

19. The process as claimed in claim 18, in which said compression treatment is carried out under a pressure of 300–700 kg./cm$^2$, and at a temperature of 50°–120° C.

20. The process as claimed in any one of claim 17 or 18 or 19, in which said compression treatment is carried out b ymeans of a calender roll.

21. The process as claimed in any one of claims 17 or 18 or 19, in which said compression treatment is carried out by means of a hot press.

22. The process as claimed in any one of claims 17 or 18, 19 or 20 21, in which said phosphor is a terbium activated gadolinium oxysulfide phosphor.

23. A process for the preparation of a radiographic intensifying screen which comprises:

subjecting a phosphor-containing resin layer which contains a resinous binder and a phosphor in a weight ratio of 1 : 25 to 1 : 100, and which has been formed by a coating procedure conduced under an atmospheric pressure to compression treatment to as to reduce the void ratio of the phosphor-containing resin layer to a value of not more than 90% of the void ratio of the untreated phosphor-containing resin layer, and providing thus treated phosphor-containing resinous layer onto the support, in which said resinous binder is a mixture of a linear polyester and nitrocellulose.

24. The process as claimed in claim 23 in which said compression treatment is carried out under a pressure of 50–1500 kg./cm$^2$, and at a temperature of not less than room temperature, but not more than the melting point of the binder.

25. The process as claimed in claim 24, in which said compression treatment is carried out under a pressure of 300–700 kg./cm$^2$, and at a temperature of 50°–120° C.

26. The process as claimed in any one of claim 23 or 24 or 25, in which said compression treatment is carried out by means of a calender roll.

27. The process as claimed in any one of claim 23 or 24 or 25, in which said compression treatment is carried out by means of a hot press.

28. The process as claimed 23 or 24 or 25 or 26 or 27, in which said phosphor is a terbium activated gadolinium oxysulfide phosphor.

* * * * *